(12) United States Patent
Miwa et al.

(10) Patent No.: US 7,014,276 B2
(45) Date of Patent: Mar. 21, 2006

(54) VACUUM BOOSTER

(75) Inventors: Akihiko Miwa, Anjo (JP); Kaoru Tsubouchi, Toyota (JP); Nobuyuki Hirota, Aichi-ken (JP); Tomoyasu Sakai, Kariya (JP)

(73) Assignee: Aisin Seiki Kabushiki Kaisha, Kariya (JP)

( * ) Notice: Subject to any disclaimer, the term of this patent is extended or adjusted under 35 U.S.C. 154(b) by 27 days.

(21) Appl. No.: 10/225,494

(22) Filed: Aug. 22, 2002

(65) Prior Publication Data

US 2003/0052533 A1    Mar. 20, 2003

(30) Foreign Application Priority Data

Aug. 24, 2001  (JP) .............................. 2001-255239
Aug. 29, 2001  (JP) .............................. 2001-259885

(51) Int. Cl.
  *B60T 8/44*    (2006.01)
(52) U.S. Cl. ................................ 303/114.3; 303/113.3; 188/356
(58) Field of Classification Search ............ 303/114.3, 303/114.1, 113.3; 188/356; 91/369.2, 369.3, 91/390; 92/84, 85 R; 60/554, 562, 552
See application file for complete search history.

(56) References Cited

U.S. PATENT DOCUMENTS

| 3,661,054 A | * | 5/1972 | Brown ...................... 91/369.4 |
| 5,873,296 A | * | 2/1999 | Shirahata et al. .......... 91/369.2 |
| 5,941,071 A | * | 8/1999 | Simon Bacardit ............ 60/553 |
| RE37,373 E | * | 9/2001 | Tsubouchi et al. ....... 303/114.3 |
| 6,374,721 B1 | * | 4/2002 | Zehnder et al. ............... 91/367 |
| 2003/0140777 A1 | * | 7/2003 | Barcardit et al. |

FOREIGN PATENT DOCUMENTS

| JP | 8318846 A | * | 12/1996 |
| JP | 2002-46592 A | * | 2/2002 |
| WO | WO 01/32488 A1 | | 5/2001 |

* cited by examiner

*Primary Examiner*—Pam Rodriguez
(74) *Attorney, Agent, or Firm*—Buchanan Ingersoll PC (57) ABSTRACT

A vacuum booster which moderates a retraction speed of a valve seat member to restrain a contact noise between a key member retracting in a unitary manner with the valve seat member and a flange surface of a plunger. The vacuum booster includes a noise restriction device.

8 Claims, 6 Drawing Sheets

VACUUM BOOSTER

This application is based on and claims priority under 35 U.S.C. § 119 with respect to Japanese Application No. 2001-255239 filed on Aug. 24, 2001 and Japanese Application No. 2001-259885 filed on Aug. 29, 2001, the entire content of which are incorporated herein by reference.

FIELD OF THE INVENTION

The present invention relates to a vacuum booster for a vehicle. More particularly, the present invention pertains to a vacuum booster for a vehicle, which assists a brake pedal depression force during the emergency brake.

BACKGROUND OF THE INVENTION

An analysis reports that the stepping force applied to a brake pedal by a driver during the emergency brake is smaller than the stepping force necessary for generating the sufficient brake hydraulic pressure for locking wheels and thus the sufficient braking performance of the vehicle is not preformed during the emergency brake that the driver suddenly steps on the brake pedal for brake depression when obstacles are suddenly appeared on the way.

In late years, devices for increasing the brake hydraulic pressure to the degree for locking the wheels during the emergency brake based on the stepping speed of the brake pedal for judging whether it is a normal brake for performing the braking operating under the normal condition or it is an emergency brake for operating the brake operation under the emergent condition have been proposed to be implemented.

A known device (i.e., vacuum booster) for assisting the brake operation for the emergency, WO 01/32488 A1 is disclosed. The known device for assisting the brake operation includes a housing formed with at least one pressure chamber therein, a movable wall which is provided in the housing for moving forward and moving backward relative to the housing and which divides the pressure chamber into a constant pressure chamber and a variable pressure chamber, a power piston connected to the movable wall, an input rod provided in the power piston for moving forward and moving backward relative to the power piston, and a plunger connected to the input rod to be inserted into the power piston for being slidable in the longitudinal direction relative to the power piston and formed with an atmosphere valve seat on the rear end portion thereof. The known device for assisting the brake operation further includes an output member for outputting the driving force of the power piston accompanied with the movement of the movable wall, a first vacuum valve seat provided on the power piston facing rearward, a second vacuum valve seat which can move forward and backward relative to the power piston and formed on the valve seat member which is approximately co-axial to the first vacuum valve seat, a valve mechanism having a movable portion facing the first vacuum valve seat and a fixing portion air-tightly fixed to the power piston, a drive means for moving a valve seat member towards the movable portion by a predetermined amount when the forward moving amount of the plunger relative to the power piston is equal to or greater than a predetermined value, a holding means for holding the valve seat member at a predetermined position in the power piston when the forward moving amount of the plunger relative to the power piston is smaller than the predetermined value, an engaging member fixed to the power piston for engaging the holding means to the power piston, and a key member inserted into a radial directional bore of the power piston for restricting the moving amount in longitudinal direction of the plunger relative to the power piston. The plunger includes a first flange portion fitted into a penetration bore provided on the valve seat member and a second flange portion formed on the rear of the first flange portion and fitted into an internal peripheral surface of the power piston. The key member is provided between the first flange portion and the second flange portion.

With the known device for assisting the brake operation with the foregoing construction, when the forward moving speed of the plunger is greater than the forward moving speed of the power piston due to the sudden depression of the brake pedal by the driver's operation, that is, when the relative moving amount in the forward direction of the plunger relative to the power piston becomes equal to or greater than the predetermined value, the engagement between the holding member and the valve seat member is released to move the valve seat member backward. By extending a distance between a rear end surface of a reaction member (i.e., reaction disc) and a front-end surface of a valve sealing portion of the valve mechanism, as it called jumping amount is increased to obtain the emergency brake characteristics.

That is, under the emergency brake operation, by switching an input-output characteristic of the vacuum booster device from a normal brake characteristics to an emergency brake characteristic, the braking characteristics the same with under the condition that the driver strongly steps on the brake pedal to be strongly depressed can be obtained.

With the known vacuum booster disclosed in the WO 01/32488 A1,the valve seat member is moved in the backward direction (i.e., rearward) when the relative moving amount of the plunger in the forward direction relative to the power piston becomes equal to or greater than the predetermined value under the emergency brake operation and when the engagement between the holding member and the valve seat member is released. Accompanying with the backward movement of the valve seat member, the key member fitted into a slit of the valve seat member is moved backward being pushed by a front groove wall of the slit of the valve seat member and the key member pushed backward contacts the front end surface of the plunger. In this case, for example, in case the key member and the plunger are made of hard material such as metal, the operational noise is generated between the key member and the plunger to decline the quality of the vacuum booster.

A need thus exists for a vacuum booster which reduces the operational noise under the emergency brake operation.

SUMMARY OF THE INVENTION

In light of the foregoing, the present invention provides a vacuum booster which includes a housing having a pressure chamber therein, a movable wall provided in the housing for being movable forward and backward and for separating the pressure chamber into a constant pressure chamber and a variable pressure chamber, a power piston having a first vacuum valve seat and a radial directional bore and unitary formed with the movable wall, an input rod provided in the power piston for being movable forward and backward relative to the power piston, a plunger having a first flange portion and a second plunge portion, connected to the input rod, inserted into the power piston slidably in a longitudinal direction relative to the power piston, and formed with an atmosphere valve seat, an output member for outputting a driving force of the power piston outside of the vacuum booster in accordance with a movement of the movable wall, a valve seat member having a second vacuum valve seat and being approximately concentric with the first vacuum valve seat and being movable forward and backward relative to the power piston, a valve mechanism provided in the power piston and having a movable portion facing the first vacuum valve seat and a fixing portion provided concentric with the movable portion, a drive means for moving the valve seat member towards the movable portion by a predetermined amount when a forward moving amount of the plunger relative to the power piston is equal to or greater than a predetermined value, a holding means for holding the valve seat member at a predetermined position in the power piston when the forward moving amount of the plunger relative to the power piston is less than the predetermined value, an engaging member for engaging the holding means with the power piston, a key member inserted into the radial directional bore and moving between the first flange portion and the second flange portion of the plunger in the longitudinal direction for restricting a longitudinal direction moving amount of the plunger relative to the power piston, and a noise restriction means for restricting a contact noise between the key member and the second flange portion of the plunger.

BRIEF DESCRIPTION OF THE DRAWING FIGURES

The foregoing and additional features and characteristics of the present invention will become more apparent from the following detailed description considered with reference to the accompanying drawing figures in which like reference numerals designate like elements.

DETAILED DESCRIPTION OF THE INVENTION

Embodiments of a vacuum booster will be explained with reference to the illustrations in the drawing figures. Referring to the illustrations in FIGS. 1–6, a first embodiment of the vacuum booster will be explained.

Figure 1:
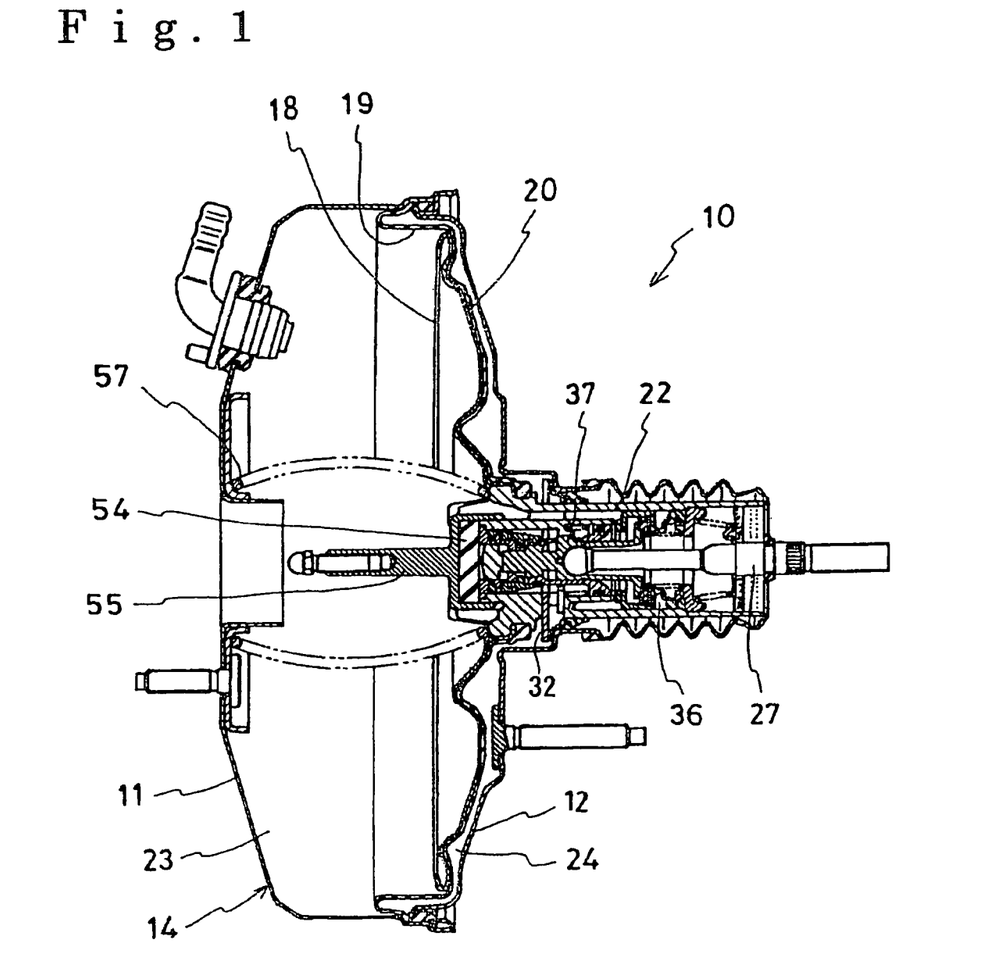
FIG. 1 is a cross-sectional overview of a vacuum booster according to a first and a second embodiments of the present invention.

As shown in FIG. 1, a vacuum booster 10 includes a front shell 11, a rear shell 12, a movable wall 20, and a housing 14 which is divided into a constant pressure chamber 23 and a variable pressure chamber 24 with the movable wall 20 whose internal configuration has disc shape. The movable wall 20 in the housing 14 is made from a metal made plate 18 and a diaphragm 19 made of rubber. The movable wall 20 is provided to be movable in longitudinal direction relative to the housing 14.

A bead portion on an outer peripheral rim of the diaphragm 19 is air-tightly supported by a cuff portion provided on the outer peripheral rim of the rear shell 12 and the front shell 11. A bead portion of an inner peripheral rim of the diaphragm 19 is air-tightly fixed to a groove provided on a front flange portion of an external periphery of the power piston 22 along with the plate 18.

The constant pressure chamber 23 is in communication with an intake manifold (not shown) of an engine, which is a source of the vacuum pressure, to be always maintained under the vacuum pressure during the engine operation. The communication between the variable pressure chamber 24 and the constant pressure chamber 23 is established or intercepted via a passage 60 and the communication between a valve mechanism 36 and the atmosphere is established or intercepted via the valve mechanism 36.

Figure 2:
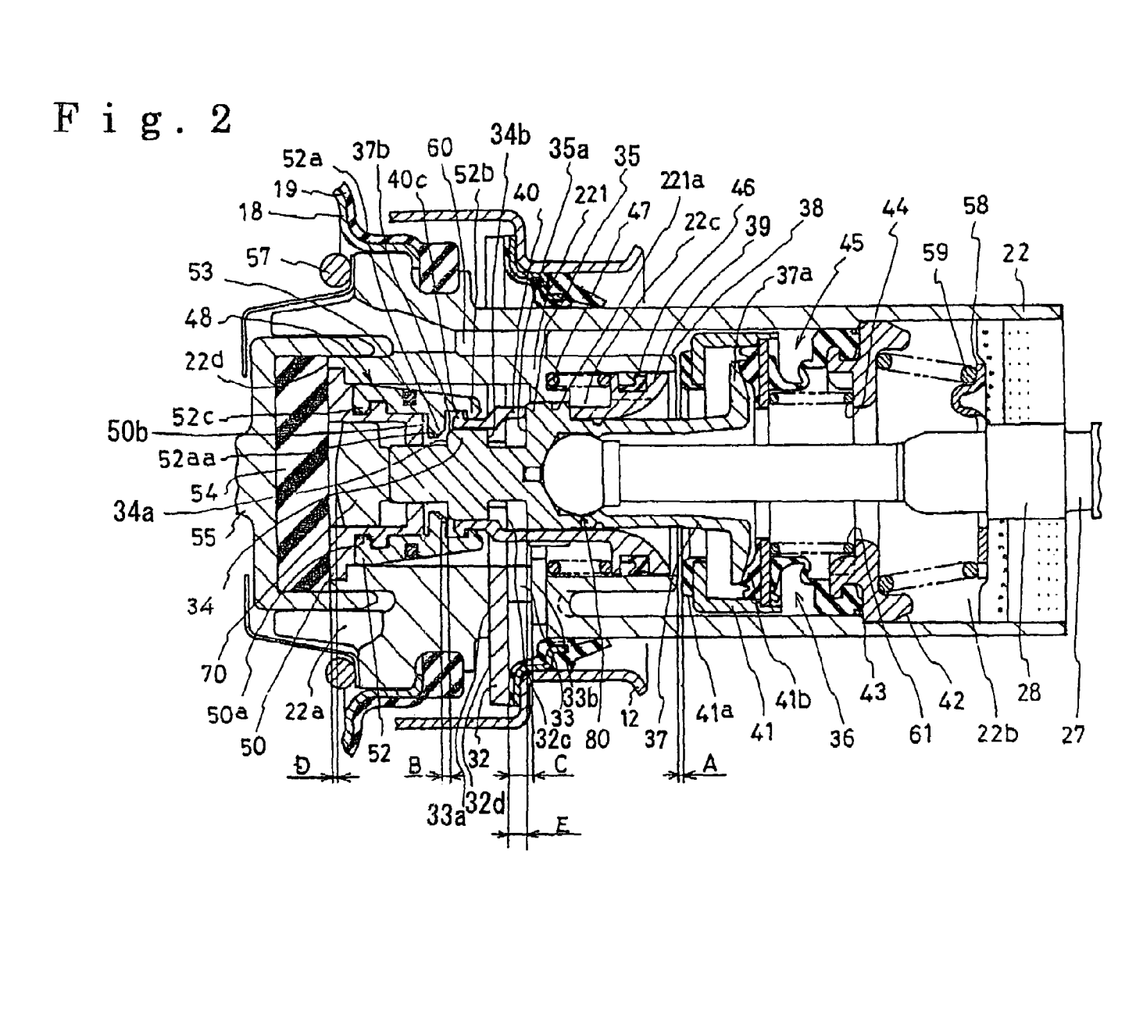
FIG. 2 is a partial magnified view showing a detail of a power piston of the vacuum booster of the first embodiment of the present invention.

As shown in FIGS. 1–2, the cylindrical power piston 22 includes a first space 22a positioned in the front (i.e., mid-left of FIGS. 1–2) in the power piston 22 to be in communication with the constant pressure chamber 23, a second space 22b positioned in the rear (i.e., mid-right of FIGS. 1–2) to be in communication with the atmosphere, and a intermediate portion 221 provided between the first space 22a and the second space 22b. The intermediate portion 221 extends in parallel with the longitudinal direction of the external diameter of the power piston 22. The intermediate portion 221 is formed with a third space 22c for establishing the communication between the first space 22a positioned in the front and the second space 22b positioned in the rear. The passage 60 for establishing the communication between the first space 22a and the second space 22b separately from the third space 22c is formed in the power piston 22.

An input rod 28 constructing an input member 27 and a plunger 37 which are penetrated through the first space 22a, the second space 22b, and the third space 22c are provided in the power piston 22 to be moved in the longitudinal direction relative to the power piston 22. The input rod 28 and the plunger 37 connected in a unitary manner at a connecting portion 80 positioned on the intermediate portion 221 by staking the outer surface of the connecting portion 80 in the radial direction. A brake pedal (not shown) is connected to the input rod 28 at rear thereof.

An annular groove portion is formed on the front end portion of the power piston 22 in the longitudinal direction, an output member 55 is fitted in the groove portion, and a reaction member 54 made of elastic material such as rubber is provided between the output member 55 and a recess portion surface on the front portion of the power piston. A space is provided between the reaction member 54 and the front end portion of the plunger 37. A contact member 70 is provided on the front end portion of the plunger 37. The contact member 70 is provided in an engaging member 50 whose front portion unitary provided with the power piston 22 has a recess configuration.

A U-shaped key member 32 is inserted into a radial directional bore 33 formed facing radial direction on the intermediate portion 221 of the power piston 22 in order to restrict the moving amount of the plunger 37 and the input rod 28 relative to the power piston 22. The thickness of the key member 32 in the longitudinal direction of the power piston 22 is predetermined to be smaller than the size of the radial directional bore 33 in the longitudinal direction of the power piston 22. The key member 32 is predetermined to move in the longitudinal direction by a distance C shown in FIG. 2 relative to the power piston 22.

The movement of the key member 32 in the backward direction is restricted by a rear end stepped portion of the rear shell 12 covered on the front outer periphery of the power piston 22. That is, the motion limit in the backward direction of the power piston 22 relative to the housing 14 is determined by the contact of a front wall 33a of the radial directional bore 33 to a front surface 32d of the key member 32 and by the contact of a rear surface 32c of the key member 32 to a rear end stepped portion of the rear shell 12. The central portion of the key member 32 is provided between a rear end surface 34b of a first flange portion 34 formed on the central portion of the plunger 37 and a front end surface 35a of a second flange portion 35 formed on the central portion of the plunger 37. Thus, the motion limit of the plunger 37 in the backward direction relative to the power piston 22 is determined to be a position where the rear end surface 34b contacts the front surface 32d of the key member 32 and the rear surface 32c of the key member 32 contacts a rear wall 33b of the radial directional bore 33b. Likewise, the motion limit of the plunger 37 in the forward direction relative to the power piston 22 is determined to be a position where the front end surface 35a contacts the rear surface 32c of the key member 32 and the front surface 32d of the key member 32 contacts the front wall 33a of the radial directional bore 33.

The valve mechanism 36 is provided in the power piston 22. The valve mechanism 36 switches an output decreasing operation condition in which the variable pressure chamber 24 is in communication with the constant pressure chamber 23 and the variable pressure chamber 24 is blocked from the atmosphere, an output holding operation condition in which the variable pressure chamber 24 is blocked from the constant pressure chamber 23 and the atmosphere, and an output increasing operation condition in which the variable pressure chamber 24 is blocked from the constant pressure chamber 23 and in communication with the atmosphere, in accordance with the movement of the plunger 37 in the longitudinal direction relative to the power piston 22.

The valve mechanism 36 includes an atmosphere valve seat 37a unitary formed on a rear end surface of a rear end portion which is flanged in the radial direction of the plunger 37, a first vacuum valve seat 38 formed on a rear end portion extended in the longitudinal direction of the intermediate portion 221 of the power piston 22 in a unitary manner, a second vacuum valve seat 39 formed on a rear end portion of a cylindrical valve seat member 40 in a unitary manner, and a movable portion 41 provided opposing the first vacuum valve seat 38 and the atmosphere valve seat 37a respectively and including valve sealing portions 41a, 41b for sealing the first vacuum valve seat 38 and the atmosphere valve seat 37a respectively. The valve mechanism 36 further includes a fixing portion 43 provided on the rear of the movable portion 41 for air-tightly fixing the second space 22b in the power piston 22 with a retainer 42 provided in the rear of the movable portion 41 for restricting the movement of the power piston 22 to the forward direction exceeding the inside stepped portion positioned in the rear of the power piston 22 and a cylindrical member 45 made of elastic material in which the movable portion 41 is biased in the forward direction by a spring 44 provided between the valve mechanism 36 and the retainer 42.

Figure 3:
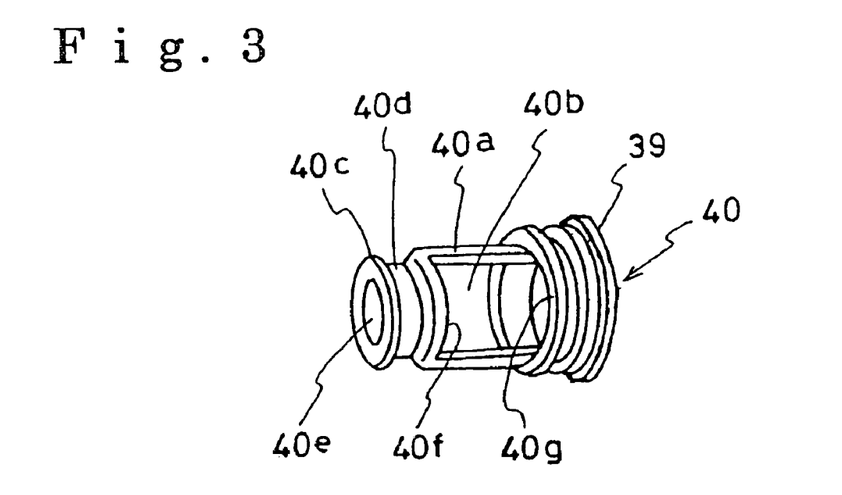
FIG. 3 is a perspective view showing an external configuration of a valve seat member according to the first and the second embodiments of the present invention.

An external configuration of the valve member 40 is shown in FIG. 3. The plunger 37 is inserted into the valve member 40 when assembled. The valve seat member 40 includes a slit 40b from which the second flange portion 35 is projected in the radial direction of the plunger 37 when assembled and a penetration bore 40e penetrated into a longitudinal direction. The valve member 40 further includes an annular portion 40d in the front of the slit 40b, a front groove wall 40f at the front of the slit 40b, and an annular rear groove wall 40g whose diameter is greater than the diameter of the front groove wall 40f in the rear. The front groove wall 40f and the rear groove wall 40g are connected in a unitary manner via two arms 40a. Two arms 40a are formed on a common imaginary line relative to an imaginary line penetrated through the center of the valve seat member 40. The key member 32 is inserted into the slit 40b so that each forked portion of the key member 32 overstrides the arm 40a. The valve seat member 40 is provided in the third space 22c of the intermediate portion 221 and movable in the longitudinal direction relative to the power piston 22.

The first flange portion 34 of the plunger 37 is inserted into the penetration bore 40e of the valve seat member 40 and the second flange portion 35 is projected from the slit 40b to the outside of the valve seat member 40. When the plunger 37 provided with the valve seat member 40 is provided in the power piston 22, the second flange portion 35 contacts an internal peripheral surface 221a of the intermediate portion 221 and the second flange portion 35 of the plunger 37 is slidably supported in the longitudinal direction along the internal peripheral surface 221a of the intermediate portion 221.

On the other hand, because the valve seat member 40 is positioned between the external periphery of the plunger 37 and an internal periphery of the intermediate portion 221 of the power piston 22 and the rear end portion of the valve seat member 40 is flanged to be expanded in the radial direction. Thus, the second vacuum valve seat 39 of the valve seat member 40 slidably contacts the internal peripheral surface of the intermediate portion 221 at two points in longitudinal direction. That is, the power piston 22 includes the intermediate portion 221 which functions to support the valve seat member 40 to be slidable in the backward direction. An annular recess portion is formed on the outer peripheral surface of the rear end portion of the valve seat member 40 provided in the intermediate portion 221. An annular sealing member 46 for achieving the airtight performance between the rear end portion of the valve seat member 40 and the internal periphery surface of the intermediate portion 221 is applied in the annular recess portion.

A spring 59 is provided between a retainer 58 retained by a stepped portion formed on a rear end side of the input rod 28 which is unitary connected to the plunger 37 at the connection portion 80 and a retainer 42 provided in the front of the retainer 58 and retained by an internal diameter stepped portion of the power piston. The spring 59 biases the input rod 28 towards the backward direction to contact the atmosphere valve seat 37a and a valve sealing portion 41b provided on the movable portion 41 of the valve mechanism 36 under the condition that the brake pedal is not depressed. The spring 59 also holds a distance between the valve sealing portion 41a provided on the movable portion 41 and the first vacuum valve seat 38 by a distance A.

The passage 60 formed in the longitudinal direction in communication with the intermediate portion 221 and the first space 22a establishes the communication between the valve mechanism 36 and the constant pressure chamber 23 and the third space 22c establishes the communication between the valve mechanism 36 and the variable pressure chamber.

Four J-shaped groove portions in the peripheral direction are formed on the inside of the intermediate portion 221 of the power piston keeping a predetermined interval from each other. A drive means for driving the valve seat member 40 in the backward direction is provided in the J-shaped groove portions. The drive means engaged with the flange formed on the rear of the valve seat member 40 includes a spring 47 for biasing the valve seat member 40 in the backward direction and the key member 32.

Figure 4:
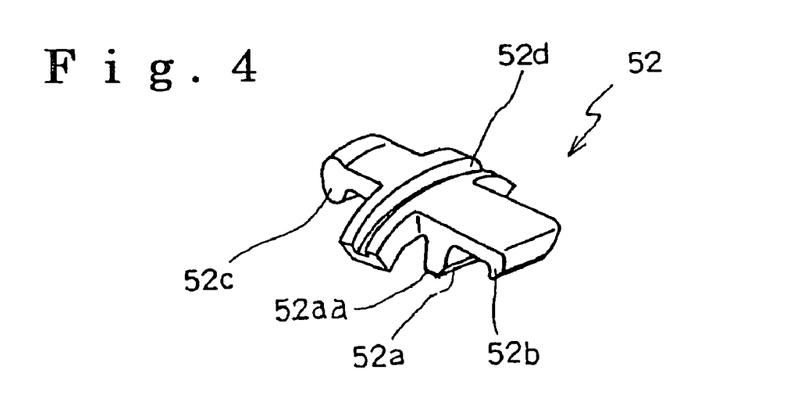
FIG. 4 is a perspective view of showing an external configuration of one of holding members according to the first and the second embodiments of the present invention.

The first space 22a positioned in the front of the power piston 22 is provided with a holding means 48. The holding means 48 includes a holding member 52 having an engagement portion 52b on the rear thereof for engaging with a portion 40c configured to be flanged at the front of the valve seat member 40 and a ring-shaped elastic body 53 for biasing the holding member 52 in the direction to contract the diameter. A holding portion 52c of the holding member 52 is engaged with a engaging groove 50a of a engaging member 50 fixed to the fore portion of the power piston 22. Thus, the movement of the holding member 52 in the longitudinal direction is prohibited and the movement of the holding member 52 in the radial direction to be expanded and to be contracted having the holding portion 52c as a supporting point (i.e., fulcrum) is allowed. As shown in FIG. 4, the holding member 52 has a configuration of a hollow frustum which is divided into three pieces separated at three planes with respect to a central axis. Three pieces of the divided hollow frustum are opposed in the peripheral direction to be assembled in the power piston 22.

With this embodiment of the vacuum booster, the plunger 37 is forwarded relative to the power piston 22, the front end surface 35a of the second flange portion 35 contacts the rear end surface of the key member 32, and the front surface 32d of the key member 32 contacts the front wall 33a of the radial directional bore 33 of the power piston 22 under the emergent brake operation. That is, the plunger 37 can move forward by a distance E relative to the power piston 22.

Figure 6:
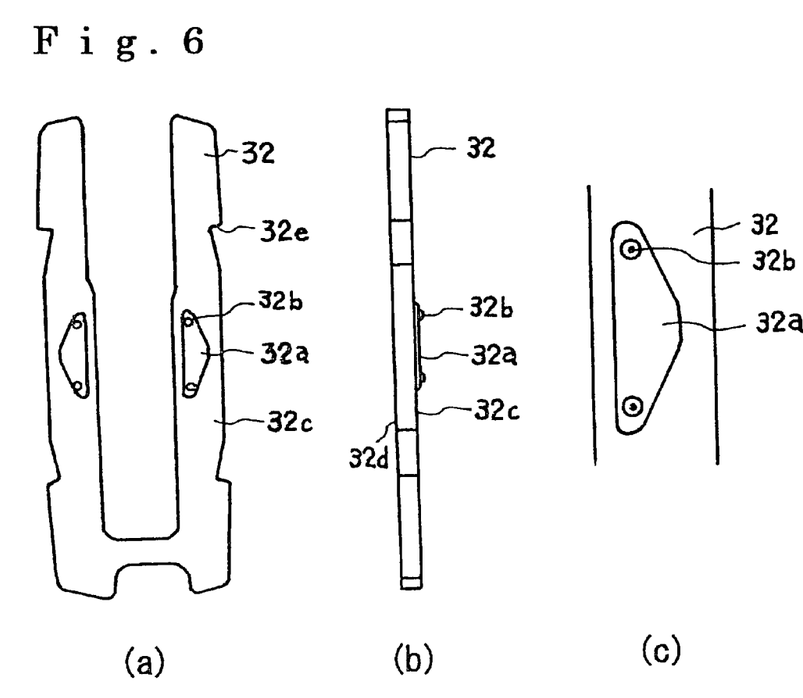
FIG. 6(a) is a front view of a key member according to the first embodiment of the present invention.
FIG. 6(b) is a side view of the key member according to the first embodiment of the present invention.
FIG. 6(c) is a partial magnified view of the key member on which an elastic member is provided according to the first embodiment of the present invention.

The construction of the key member 32 will be explained with reference to FIG. 6. As shown in FIG. 6(a), the key member 32 is made from metal member configured to be U-shape one end of which is forked. The key member 32 restricts the longitudinal movement of the plunger 37. Two recesses 32e are provided on external side of each forked portion of the key member 32. Four recesses in total are provided on the key member 32. The key member 32 is disposed to the radial directional bore 33 formed in the radial direction of the power piston 22 under the condition that the movement of the key member 32 in the longitudinal direction is allowed but the movement of the key member 32 in the radial direction is prohibited relative to the power piston 22 with the function of the recesses 32e. As shown in FIG. 6(b), a front surface 32d is configured to be plane and an elastic member 32a is unitary formed in the center on each forked portion of the key member 32 (i.e., two elastic members 32a in total are provided on the key member 32).

The elastic members 32a are formed on the key member 32 by vulcanizing the rubber and baking relative to the key member 32. The elastic member 32a has an approximate semicircular configuration having an arc surface on the external side. The elastic member 32a is provided inside of the valve seat member 40 for preventing the direct contact of the front end surface 35a of the plunger 37 to the key member 32. Two frustum projections 32b are provided on top and bottom portions of each elastic member 32a respectively. The key member 32 is positioned so that the projections 32b face the front end surface 35a of the plunger 37.

The operation of the vacuum booster 10 will be explained as follows. Because the operation of the vacuum booster under the normal condition has been known, the explanation is omitted and, mainly, the operation under the emergency brake will be explained.

The emergency brake characteristic of the vacuum booster 10 is achieved by changing the jumping characteristics to apply the greater driving force than the condition under the normal brake operation to the output member. In order to change the jumping characteristics, it is necessary to extend a distance D between the contact member 70 and the reaction member 54 shown in FIG. 2. The extension of the distance D corresponds to the extension of the distance between a contact surface 22d of the power piston 22 to the reaction member 54 and the valve sealing portion 41b. That is, by moving the valve sealing portion 41b backward, the distance D is extended to increase the output before the contact member 70 receives the reaction force from the reaction member 54. Thus, the output under the jumping condition in which the ratio of the output relative to the input becomes the infinite is determined to be greater than the normal condition.

Physical operation under the emergency brake operation will be explained as follows.

When the relative moving amount between the plunger 37 and the power piston 22 becomes greater than a predetermined value B under the emergency brake operation in which the driver suddenly steps on the brake pedal for the depression due to the emergence of the obstacles during the vehicle traveling, an incline 37b of the plunger 37 contacts a tapered portion 52a of the holding member 52 and expands the holding member 52 which is biased in the contracted direction by the ring-shaped elastic body 53 in the radial direction.

A smallest internal diameter portion 52aa projecting inside of the tapered portion 52a runs on the first flange portion 34 of the plunger 37 and the engagement between the portion 40c to be engaged of the valve seat member 40 and the engagement portion 52b of the holding member 52 is released. When the engagement between the portion 40c to be engaged and the engagement portion 52b is released, the valve seat member 40 is biased backward by the spring 47 provided between the J-shaped groove portion inside of the power piston 22 and the fore end of the flange portion on the rear of the valve seat member 40. Thus, the valve seat member 40 is moved backward by the biasing force of the spring 47 immediately after releasing the engagement of the portion 40c to be engaged.

In this case, because the key member 32 is fitted so as to sandwich two arms 40a, 40a when the valve seat member 40 is moved backward the fore surface 32d of the key member 32 is pushed backward by the front groove wall 40f in accordance with the backward movement of the valve seat member 40, and thus, the key member 32 and the valve seat member 40 are moved backward in a unitary manner. The key member 32 can be moved by the distance E and the key member 32 contacts the front end surface 35a of the second flange portion 35 of the plunger 37 during the movement. With the construction of the first embodiment, because the elastic members 32a and the projections 32b are provided on the portion that the key member 32 contacts the fore end surface 35a of the second flange portion 35, the projections 32b first contacts the fore end surface 35a of the second flange portion 35 during the backward movement of the key member 32. The projections 32b are gradually deformed by the moving force (i.e., driving force) of the key member 32 in the backward direction. Then the driving force is damped. And because the force which is not absorbed by the projections 32b is eventually transmitted to the elastic members 32a, the force at the contact can be absorbed by the elastic members 32a including the projections 32b. Thus, when the relative moving amount in the forward direction relative to the power piston 22 of the plunger 37 becomes equal to or greater than a predetermined value, the engagement between the holding member 48 and the valve seat member 40 is released to retract the valve seat member 40, the driving force is absorbed by the deformation of the elastic members 32a including the projections 32b provided between the fore end surface 35a of the second flange portion 35 and the rear surface 32c of the key member 32 even if the key member 32 is moved in the backward direction, and the operational noise caused by the contact between the fore end surface 35a of the second flange portion 35 and the rear surface 32c of the key member 32 can be reduced. In this case, because the contacting force is received by small dimension with a top of the frustum at the beginning, the operational noise can be further reduced compared to the case receiving the contacting force by the large dimension directly.

When the valve seat member 40 is moved backward, the second vacuum valve seat 39 of the valve seat member 40 contacts the valve sealing portion 41a constructing the movable portion 41 of the valve mechanism 36 to intercept the communication between the constant pressure chamber 23 and the variable pressure chamber 24. In this case, because the plunger 37 is under the process for moving forward unitary with the input rod 28 and the valve seat member 40 pushes back the movable portion 41 of the valve mechanism 36 backward, the atmosphere valve seat 37a of the plunger 37 and the valve sealing member 41b constructing the movable portion 41 of the valve mechanism 36 are suddenly separated to establish the communication between the variable pressure chamber 24 and the atmosphere. Thus, compared to the normal brake operation, the establishment and the interception of the communication between the constant pressure chamber 23 and the variable pressure chamber 24 are performed swiftly under the emergent brake operation, the distance between the valve sealing member 41b and the contact surface 22d of the power piston 22 relative to the reaction member 54 is substantially extended, and the output under the jumping condition can be increased under the emergent brake operation compared to the normal brake operation.

Figure 5:
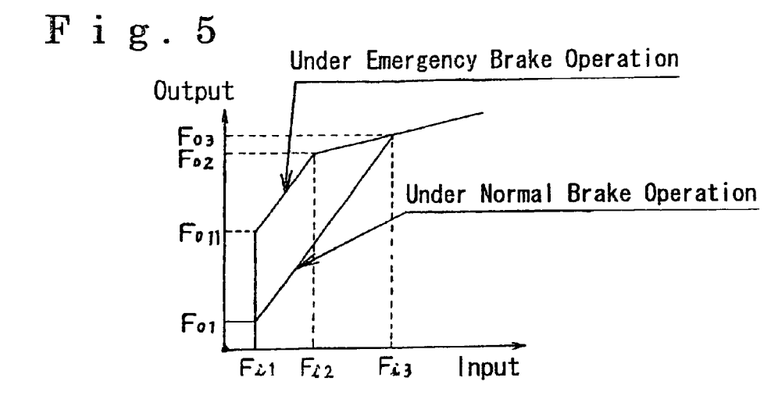
FIG. 5 is a characteristic view showing a relationship between a force applied to an input rod (i.e., input) of the vacuum booster and a driving force (i.e., output) of an output member according to the first and the second embodiments of the present invention.

FIG. 5 shows the normal brake characteristics and the emergent brake characteristics. As shown in FIG. 5, the jumping under the normal brake operation obtains the output corresponding to $F_{O1}$ and the jumping under the emergency brake operation obtains the output corresponding to $F_{O11}$. Thus, under the emergency brake operation, sufficient brake hydraulic pressure can be generated with small pedal depression force.

When the brake pedal is returned to the initial position after the completion of the brake operation, the plunger 37 moves backward while the rear end surface 34b of the first flange portion 34 contacts the fore surface of the key member 32. When the rear surface of the key member 32 contacts the rear shell 12, the fore surface of the key member 32 contacts the fore groove wall 40f of the valve seat member 40 to restrict the backward movement of the valve seat member 40 retracted unitary with the power piston 22. In this case, because the power piston 22 is further retracted, the engagement portion 52b of the holding member 52 unitary retracted with the power piston 22 is engaged with the portion 40c to be engaged of the valve seat member 40 remaining stationary contacting the rear shell 12 via the key member 32, and thus the holding member 52 and the valve seat member 40 whose engagement has released under the emergent brake operation is reengaged to be ready for the next emergency brake operation.

According to the embodiment of the vacuum booster of the present invention, when the relative moving amount of the plunger in the forward direction relative to the power piston reaches the predetermined value, the engagement between the holding member and the valve seat member is released to retract the valve seat member. And because the elastic member is provided between the fore end surface of the second flange portion and the rear surface of the key member, the operational noise caused by the contact between the fore end surface of the second flange portion and the rear surface of the key member can be reduced by the deformation of the elastic member in accordance with the movement of the key member even under the backward movement of the key member, and thus, the quality of the vacuum booster can be improved.

In this case, by forming the projections on the elastic member, the driving force of the key member when moving backward can be absorbed by the deformation of the projections in accordance with the backward movement of the key member when the relative moving amount in the forward direction of the plunger relative to the power piston reaches equal to or greater than the predetermined value. Thus, the operational noise between the fore end surface of the second flange portion and the rear surface of the key member can be further reduced.

A second embodiment of a vacuum booster according to the present invention will be explained with reference to the illustrations in the drawing figures.

Figure 7:
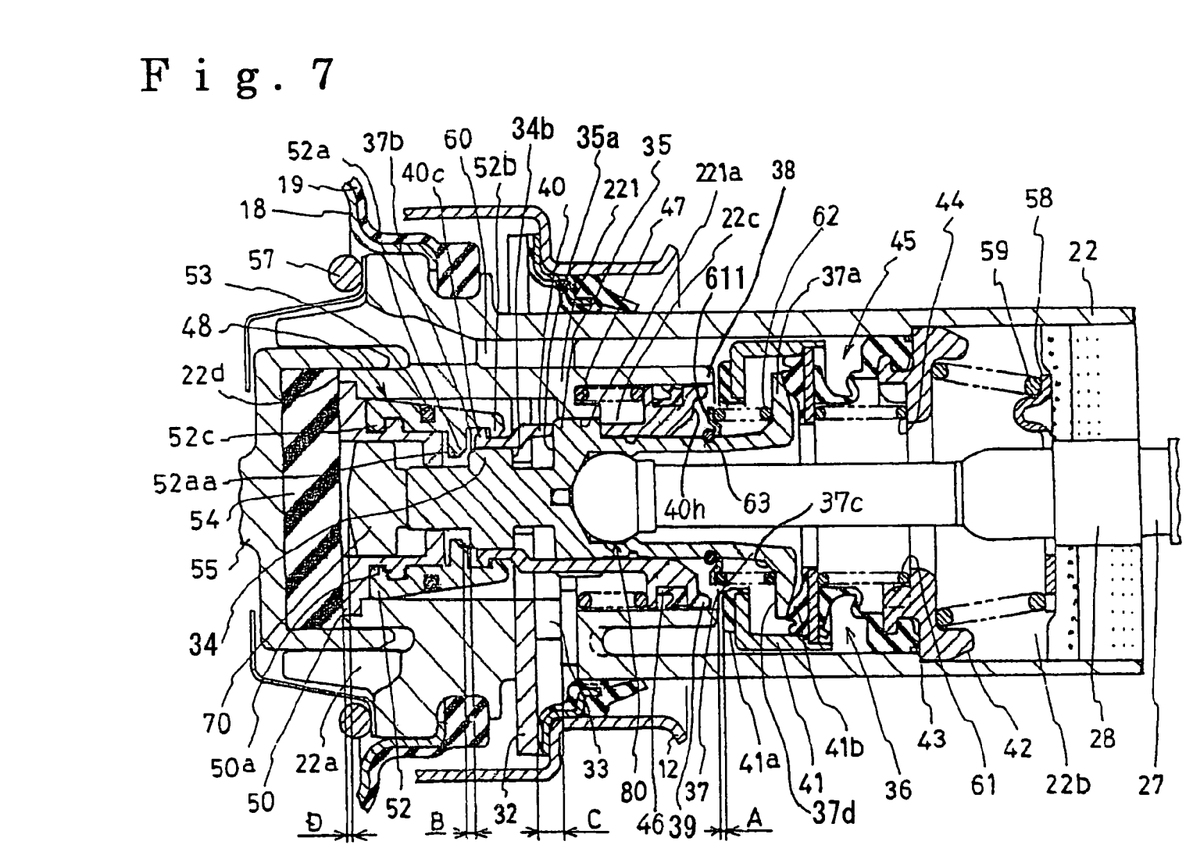
FIG. 7 is a partial magnified view of a vacuum booster showing a detail of a power piston according to the second embodiment of the present invention.

Constructions of vacuum booster according to the second embodiment of the present invention is the same with the first embodiment except the point that the vacuum booster of the second embodiment is provided with a mechanism for noise restriction including a spring 62, a snap ring 63, a retainer 611, a rear flange portion 37d, a rear end surface 40h, and an incline portion 37c instead of the elastic members 32a and projections 32b of the first embodiment.

Figure 8:
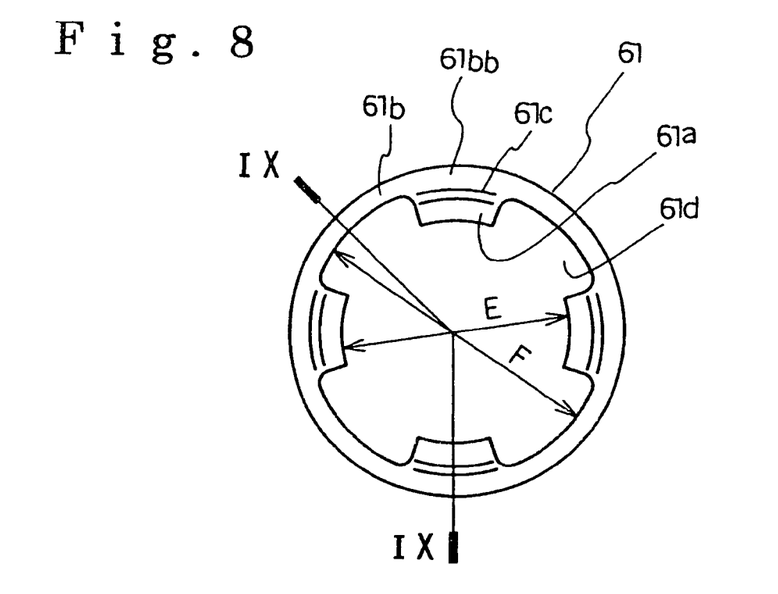
FIG. 8 is a front view of a retainer according to the second embodiment of the present invention.
Figure 9:
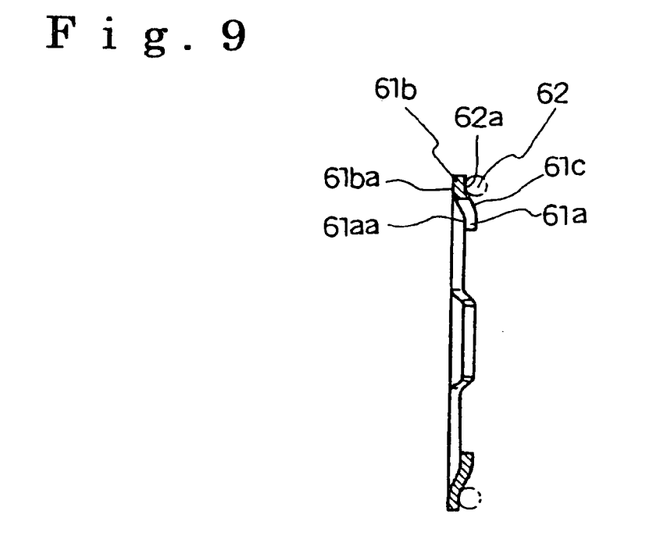
FIG. 9 is a cross-sectional view of the retainer taken on line IX—IX of FIG. 8 according to the second embodiment of the present invention.

As shown in FIGS. 7–9, with the vacuum booster 10 according to the second embodiment, the retainer 611 is provided on the outer periphery of a rear cylindrical portion of the plunger 37. The snap ring 63 fitted in an annular groove formed on the outer periphery of the rear cylindrical portion of the plunger 37 restricts the forward movement of the retainer 611. A spring 62 is provided to be compressed to have a predetermined preload between the retainer 61 and the rear flange portion 37d of the plunger 37. The preload of the spring 62 is predetermined to be smaller than the biasing force of the spring 47 in the backward direction.

As shown in FIGS. 7–9, the retainer 61 is provided on the outer periphery of the rear cylindrical portion of the plunger 37. The retainer 61 includes four pawl portions 61a, 61a, 61a, 61a having a front end surface 61aa contacting the snap ring 63, a ring portion 61b having a rear end surface 61bb contacting a front end surface portion of the spring 62, and a connecting portion 61c for connecting the pawl portion 61a and the ring portion 61b.

When the relative moving amount of the plunger 37 in the forward direction relative to the power piston 22 becomes equal to or greater than the predetermined value, the engagement between the holding means 48 and the valve seat member 40 is released to perform the emergent brake operation. In this case, the valve seat member 40 is unitary retracted with the key member 32 by the biasing force of the spring 47. The rear end surface 40h of the valve seat member 40 contacts a front end surface 61ba of the ring portion 61b of the retainer 61 and the valve seat member 40 is further retracted while compressing the spring 62 before the rear surface of the key member 32 contacts the fore end surface 35a of the second flange portion 35. When the rear surface of the key member 32 contacts the fore end surface 35a of the second flange portion 35 of the plunger 37, the retracting movement of the valve seat member 40 is stopped.

That is, because the valve seat member 40 is retracted against the biasing force of the spring 62, the retracting speed of the valve seat member 40 is appropriately moderated to restrain the contacting noise when the key member 32 retracted unitary with the valve seat member 40 contacts the fore end surface 35a of the second flange portion 35 of the plunger 37.

According to the second embodiment of the vacuum booster of the present invention, the movement of the spring 62 in the radial direction is restricted by an inclined connecting portion 61c on one end and the movement of the spring 62 in the radial direction is restricted by the incline portion 37c provided between the rear cylindrical portion of the plunger 37 and the rear flange portion 37b on the other end. In other words, the spring 62 is positioned co-axial to the retainer 61, the plunger 37, the valve seat member 40, and the power piston 22. Thus, the contact locus between the valve seat member 40 and the retainer 61, that is, the contact locus between the valve seat member 40 and the fore end surface of the spring 62 becomes co-axial without being deviated in the radial direction and thus the moment is not generated in the valve seat member 40 and the spring 62. Thus, the frictional force between the valve seat member 40 and the internal peripheral surface of the power piston 22 is not increased and the smooth movement of the valve seat member 40 is achieved.

An internal diameter E of the pawl portion 61a of the retainer 61 is predetermined to be smaller than an external diameter of the second flange portion 35 of the plunger 37. An internal diameter F of the ring portion 61b is predetermined to be greater than the external diameter of the second flange portion 35. A plurality of recess portions is provided on the second flange portions 35. By inserting and moving the retainer 61 rearward from the first flange portion 34 side of the plunger 37 by agreeing the plural recesses of the second flange 35 with the pawl portion 61a, the retainer 61 passes through the second flange portion 35 to be provided to the outer periphery of the rear cylindrical portion of the plunger 37 when assembling.

The operation of the vacuum booster 10 will be explained as follows. Because the operation of the vacuum booster under the normal condition has been known, the explanation is omitted and the mainly the operation under the emergency brake will be explained.

The emergent brake characteristic of the vacuum booster 10 is achieved by changing the jumping characteristics to apply the greater driving force than the condition under the normal brake operation to the output member. In order to change the jumping characteristics, it is necessary to extend a distance D between the contact member 70 and the reaction member 54 shown in FIG. 2. The extension of the distance D corresponds to the extension of the distance between a contact surface 22d of the power piston 22 to the reaction member 54 and the valve sealing portion 41b. That is, by moving the valve sealing portion 41b backward, the distance D is extended to increase the output before the contact member 70 receives the reaction force from the reaction member 54. Thus, the output under the jumping condition in which the ratio of the output relative to the input becomes the infinite is determined to be greater than the normal condition.

Physical operation under the emergent brake operation will be explained as follows.

When the relative moving amount between the plunger 37 and the power piston 22 becomes greater than a predetermined value B under the emergent brake operation in which the driver suddenly steps on the brake pedal for the depression due to the emergence of the obstacles during the vehicle traveling, an incline 37b of the plunger 37 contacts a tapered portion 52a of the holding member 52 and expands the holding member 52 which is biased in the contracted direction by the ring-shaped elastic body 53 in the radial direction.

A smallest internal diameter portion 52aa projecting inside of the tapered portion 52a runs on the first flange portion 34 of the plunger 37 and the engagement between the portion 40c to be engaged of the valve seat member 40 and the engagement portion 52b of the holding member 52 is released. Thus, the valve seat member 40 is moved backward by the biasing force of the spring 47 immediately after releasing the engagement of the portion 40c to be engaged.

When the valve seat member 40 is moved backward, the second vacuum valve seat 39 of the valve seat member 40 contacts the valve sealing portion 41a constructing the movable portion 41 of the valve mechanism 36 to intercept the communication between the constant pressure chamber 23 and the variable pressure chamber 24. In this case, because the plunger 37 is under the process for moving forward unitary with the input rod 28 and the valve seat member 40 pushes back the movable portion 41 of the valve mechanism 36 backward, the atmosphere valve seat 37a of the plunger 37 and the valve sealing member 41b constructing the movable portion 41 of the valve mechanism 36 are suddenly separated to establish the communication between the variable pressure chamber 24 and the atmosphere. Thus, compared to the normal brake operation, the establishment and the interception of the communication between the constant pressure chamber 23 and the variable pressure chamber 24 are performed swiftly under the emergent brake operation, the distance between the valve sealing member 41b and the contact surface 22d of the power piston 22 relative to the reaction member 54 is substantially extended, and the output under the jumping condition can be increased under the emergent brake operation compared to the normal brake operation.

FIG. 5 shows the normal brake characteristics and the emergent brake characteristics. As shown in FIG. 5, the jumping under the normal brake operation obtains the output corresponding to $F_{O1}$ and the jumping under the emergency brake operation obtains the output corresponding to $F_{O11}$. Thus, under the emergency brake operation, sufficient brake hydraulic pressure can be generated with small pedal depression force.

When the brake pedal is returned to the initial position after the completion of the brake operation, the plunger 37 moves backward while the rear end surface 34b of the first flange portion 34 contacts the fore surface of the key member 32. When the rear surface of the key member 32 contacts the rear shell 12, the fore surface of the key member 32 contacts the fore groove wall 40f of the valve seat member 40 to restrict the backward movement of the valve seat member 40 retracted unitary with the power piston 22. In this case, because the power piston 22 is further retracted, the engagement portion 52b of the holding member 52 unitary retracted with the power piston 22 is engaged with the portion 40c to be engaged of the valve seat member 40 remaining stationary contacting the rear shell 12 via the key member 32, and thus the holding member 52 and the valve seat member 40 whose engagement has released under the emergent brake operation is reengaged to be ready for the next emergency brake operation.

According to the embodiment of the vacuum booster of the present invention, the retracting speed of the valve seat member is appropriately moderated and the contacting noise caused due to the contact between the key member retracted in a unitary manner with the valve seat member and the flange surface is restrained.

According to the embodiments of the vacuum booster of the present invention, backward direction corresponds to the brake pedal side relative to the vacuum booster or the rear side of the vehicle and the forward direction corresponds to the master cylinder side relative to the vacuum booster or the fore side of the vehicle.

According to the embodiment of the vacuum booster of the present invention, the frictional force between the valve seat member and the internal peripheral surface of the power piston is not increased, thus to achieve the smooth movement of the valve seat member.

The principles, preferred embodiment and mode of operation of the present invention have been described in the foregoing specification. However, the invention which is intended to be protected is not to be construed as limited to the particular embodiment disclosed. Further, the embodiment described herein is to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A vacuum booster comprising:
   a housing having a pressure chamber therein;
   a movable wall provided in the housing for being movable forward and backward and for separating the pressure chamber into a constant pressure chamber and a variable pressure chamber;
   a power piston having a first vacuum valve seat and a radial directional bore and unitarily formed with the movable wall;
   an input rod provided in the power piston for being movable forward and backward relative to the power piston;
   a plunger having a first flange portion and a second flange portion, connected to the input rod, inserted into the power piston slidably in a longitudinal direction relative to the power piston, and formed with an atmosphere valve seat;
   an output member for outputting a driving force of the power piston outside of the vacuum booster in accordance with a movement of the movable wall;
   a valve seat member having a second vacuum valve seat and being approximately concentric with the first vacuum valve seat and being movable forward and backward relative to the power piston;
   a valve mechanism provided in the power piston and having a movable portion facing the first vacuum valve seat and a fixing portion provided concentric with the movable portion;
   a drive means for moving the valve seat member towards the movable portion by a predetermined amount when a forward moving amount of the plunger relative to the power piston is equal to or greater than a predetermined value;
   a holding means for holding the valve seat member at a predetermined position in the power piston when the forward moving amount of the plunger relative to the power piston is less than the predetermined value;
   an engaging member for engaging the holding means with the power piston;
   a key member inserted into the radial directional bore and moving between the first flange portion and the second flange portion of the plunger in the longitudinal direction for restricting a longitudinal direction moving amount of the plunger relative to the power piston;
   a noise restriction means for restricting a contact noise between the key member and the second flange portion of the plunger; and
   the noise restriction means being mounted on a rear surface of the key member and being positioned inside the valve seat member for preventing direct contact of the second flange portion of the plunger with the key member.

2. A vacuum booster according to claim 1, wherein the noise restriction means includes an elastic member provided between a front end surface of the second flange portion and a rear surface of the key member.

3. A vacuum booster according to claim 2, wherein the elastic member is formed with a projection.

4. A vacuum booster according to claim 3, wherein the projection is configured to be a frustum.

5. A vacuum booster according to claim 4, wherein a plurality of projections are formed on the elastic member.

6. A vacuum booster, comprising:
   a housing having a pressure chamber therein;
   a movable wall provided in the housing for being movable forward and backward and for separating the pressure chamber into a constant pressure chamber and a variable pressure chamber;
   a power piston having a first vacuum valve seat and a radial directional bore and unitarily formed with the movable wall;
   an input rod provided in the power piston for being movable forward and backward relative to the power piston;
   a plunger having a first flange portion and a second flange portion, connected to the input rod, inserted into the power piston slidably in a longitudinal direction relative to the power piston, and formed with an atmosphere valve seat;
   an output member for outputting a driving force of the power piston outside of the vacuum booster in accordance with a movement of the movable wall;
   a valve seat member having a second vacuum valve seat and being approximately concentric with the first vacuum valve seat and being movable forward and backward relative to the power piston;

a valve mechanism provided in the power piston and having a movable portion facing the first vacuum valve seat and a fixing portion provided concentric with the movable portion;

a drive means for moving the valve seat member towards the movable portion by a predetermined amount when a forward moving amount of the plunger relative to the power piston is equal to or greater than a predetermined value;

a holding means for holding the valve seat member at a predetermined position in the power piston when the forward moving amount of the plunger relative to the power piston is less than the predetermined value;

an engaging member for engaging the holding means with the power piston;

a key member inserted into the radial directional bore and moving between the first flange portion and the second flange portion of the plunger in the longitudinal direction for restricting a longitudinal direction moving amount of the plunger relative to the power piston; and noise restriction means for restricting a contact noise between the key member and the second flange portion of the plunger, the noise restriction means being mounted on a rear surface of the key member and being movable together with the key member as the key member moves between the first and second flange portions;

wherein the noise restriction means contacts a front surface of the second flange portion of the plunger during backward movement of the key member.

7. A vacuum booster according to claim 6, wherein the noise restriction means includes an elastic member mounted on a rear surface of the key member.

8. A vacuum booster according to claim 7, wherein the elastic member is formed with at least one projection.

* * * * *